J. T. WHALEN.
PERMUTATION PADLOCK.
APPLICATION FILED JULY 14, 1908.
940,763.
Patented Nov. 23, 1909.
3 SHEETS—SHEET 1.
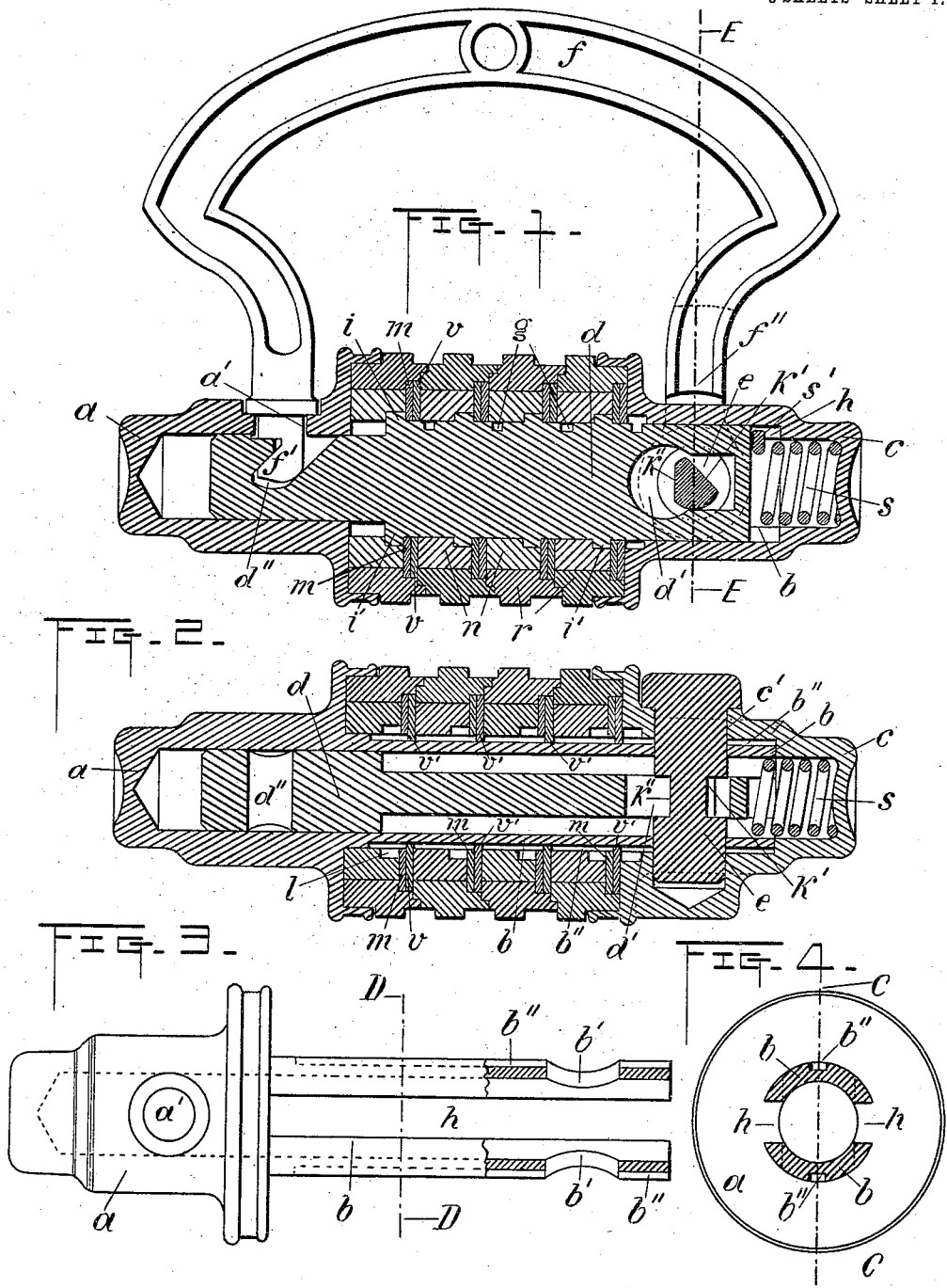
Witnesses:
G. R. Thomas
F. W. Parker
John T. Whalen
Inventor.
By his Attorney: Alfred P. Eton J. T. WHALEN.
PERMUTATION PADLOCK.
APPLICATION FILED JULY 14, 1908.
940,763.
Patented Nov. 23, 1909.
3 SHEETS—SHEET 2.
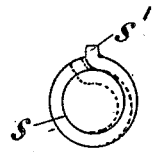
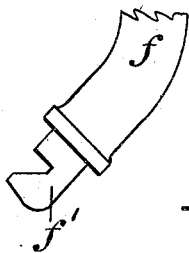
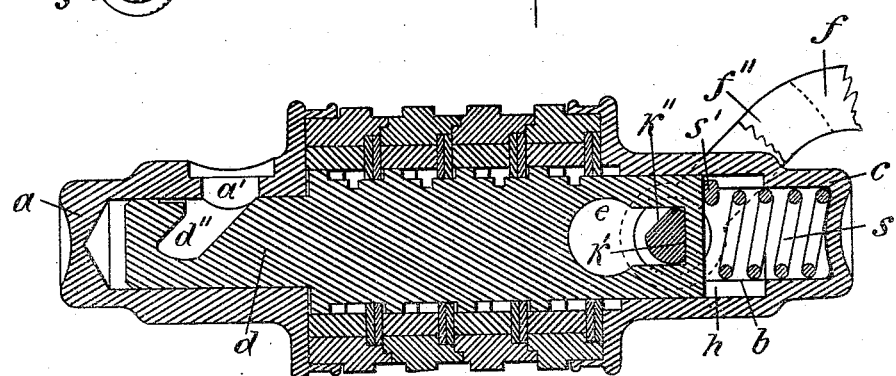
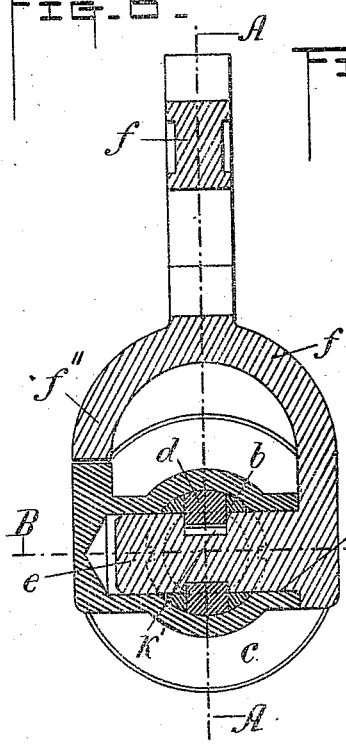
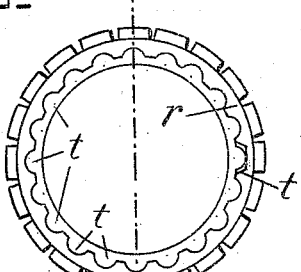
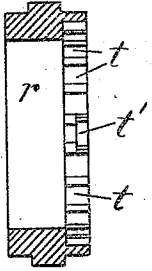
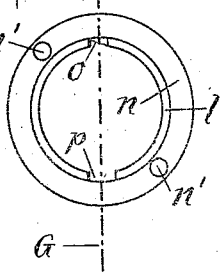
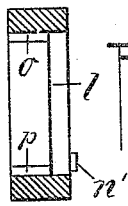
Witnesses:
G. R. Thomas
John T. Whalen
Inventor.
By his Attorney: Alfred P. Olsen

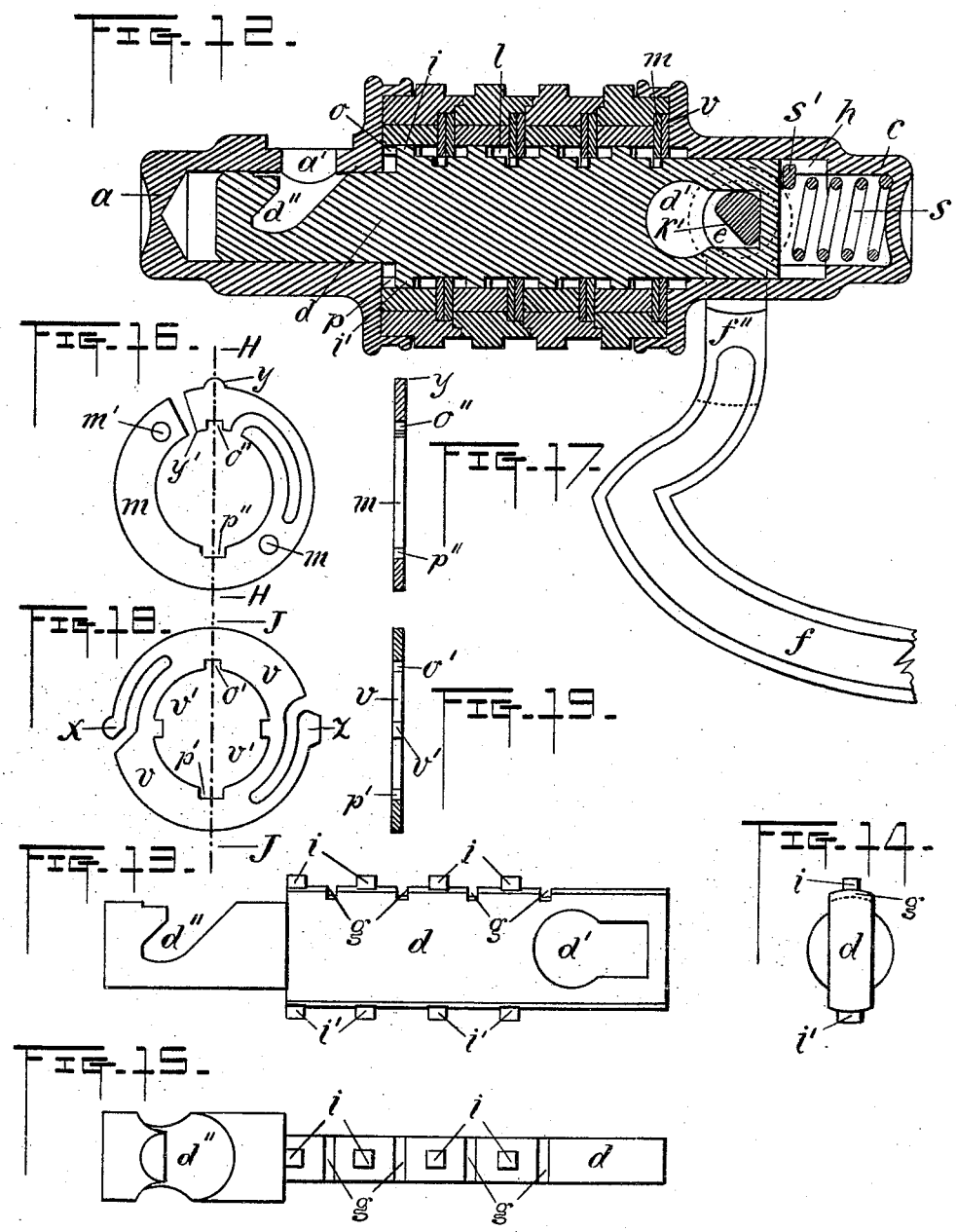

UNITED STATES PATENT OFFICE.

JOHN T. WHALEN, OF NEW YORK, N. Y., ASSIGNOR, BY DIRECT AND MESNE ASSIGNMENTS, TO THE WHALEN COMPANY, OF JERSEY CITY, NEW JERSEY, A CORPORATION OF NEW JERSEY.

PERMUTATION-PADLOCK.

940,763.      Specification of Letters Patent.      Patented Nov. 23, 1909.

Application filed July 14, 1908. Serial No. 443,569.

*To all whom it may concern:*

Be it known that I, JOHN T. WHALEN, a citizen of the United States, and resident of Greater New York, State of New York, have invented certain new and useful Improvements in Permutation-Padlocks; and I do hereby declare that the following is a full, clear, and exact description of the invention, such as will enable others skilled in the art to which it appertains to make and use the same.

In my applications for U. S. Letters Patent, Serial Nos. 406,019, 438,637 and 439,414, filed December 11th, 1907, June 15th, 1908, and June 19th, 1908, respectively, I have described permutation padlocks the most prominent and distinguishing features of which I claim to be,—reliability and simplicity of operation. The present application also relates to keyless locks of this description and purposes to disclose further, novel improvements in the construction and the advantageous arrangement of their operating parts and in the assembling of the same, as well as in the manner of manipulating such locks, which improvements, being most essential to the production of a thoroughly practical and serviceable permutation padlock, may be deemed of considerable importance.

The principal object of my invention is to produce a keyless permutation padlock, having a minimum number of parts, the "combination" of which may be very quickly and easily changed not only without the use of tools and without detaching a single part therefrom, but also without giving the permutating rings any other but the usual rotary motion for the purpose of shifting the same independently from the tumblers.

A further object is to make such locks, without adding a single part thereto, absolutely self-locking, which term, in this connection, is to convey that the parts of the lock are inseparably and undetachably maintained in operative engagement without screws, rivets and soldered or similar joints, and in such a way that by no manner or means will it be possible to in any respect disrupt the organization of the mechanism, or to detrimentally affect its proper functions, except through wilfully damaging the lock.

The first named object I accomplish by utilizing the shackle and the locking bolt, when in a certain unusual position, to simultaneously disconnect or disengage all of the permutating rings from the corresponding tumblers, employing click-springs or resilient pawls as the direct medium for variably-adjustably engaging and disengaging the exterior or permutating rings and the tumblers or inner rings, without giving motion of any kind to either of the rings.

The other object is attained by rotatively securing the hinge-pin of the shackle to the locking bolt in such a way that the spring which I employ to eject the free end of the shackle, after the combination of the lock has been set correctly, effectually and entirely prevents said hinge-pin from becoming displaced or withdrawn, thereby confining all parts of the lock.

One way of carrying out in a practical manner the above and additional, more or less important objects, is hereinafter more detailedly described and shown in the three annexed drawings, as well as particularly pointed out in the claims hereto appended.

In the drawings, in which like characters of reference indicate like parts in all of the views, Figure 1 is a vertical, longitudinal central section, on line A A of Fig. 6, of my lock when open, the shackle proper being shown in side view. Fig. 2 is a horizontal, longitudinal central section, on line B B of Fig. 6. Fig. 3 is a top view of the end piece having the shank with part of the latter shown in section, on line C C of Fig. 4. Fig. 4 is an end view of the end piece having the shank with the latter shown in vertical section, on line D D of Fig. 3. Fig. 5 is a vertical, longitudinal central section, on line A A of Fig. 6, of my lock when open, the shackle being shown in side view and partly broken away. Fig. 6 is a vertical, transverse section of the lock through its hinge-pin, on line E E of Fig. 1. Fig. 7 is a front view of the main spring with its detent. Fig. 8 is an end view of one of the exterior or permutating rings. Fig. 9 is a vertical, central section of a permutating ring, on line F F of Fig. 8. Fig. 10 is an end view of one of the tumblers or inner rings. Fig. 11 is a vertical, central section of a tumbler, on line G G of Fig. 10. Fig. 12 is a vertical, longitudinal central section, on line A A of Fig. 6, of my lock when open and in a position for changing the combination, the shackle being shown in side view and partly broken away. Fig. 13 is a side elevation of the locking bolt with its wards. Fig. 14 is an end view of the locking bolt. Fig. 15 is a top view of the locking bolt. Fig. 16 is an end view of the click-spring pawl for changing the combination, and Fig. 17 is a section of such a pawl, on line H H of Fig. 16. Fig. 18 is an end view of the click-spring pawl for setting the combination, and Fig. 19 is a section of the latter, on line J J of Fig. 18.

Referring now to the drawings,—an apertured end piece, as $a$, has, preferably integral with it, a bifurcated, apertured shank, as $b$. The opposite, cup-shaped, end piece, as $c$, is mounted on the free end of shank $b$ and is shown to be provided with a circular, radial, opening, as $c'$, at preferably one side only, which opening registers, or is in alinement, with corresponding apertures as $b'$, on the shank near its free end, to admit the hinge-pin $e$ of shackle $f$. A locking bolt, as $d$, provided with two rows of radially projecting wards, as $i$ and $i'$, transverse notches $g$ and an aperture $d'$ at its rectangular part, and a slanting, transverse slot $d''$ at its circular part, is adapted to freely slide, longitudinally, in the bifurcation $h$ of shank $b$, at the same time slidably engaging the end pieces $a$ and $c$ and hinge pin $e$ of shackle $f$. A spring, as $s$, mounted within end piece $c$, presses against the rectangular end of locking bolt $d$ and at all times tends to move the latter in the direction of end piece $a$. The free end $f'$ of shackle $f$ is slantingly and transversely slotted and adapted to enter aperture $a'$ of end piece $a$ to engage with and interlock the transverse slot $d''$ of locking bolt $d$, see Fig. 1.

As is seen, shackle $f$ and locking bolt $d$, at both of their ends engage and lock one the other, thus forming, with only two parts, a closed circuit or ring, which may be of any desired shape or strength. This two-part closed link in a lock with a pivoted shackle which has no separate hinge-pin, constitutes a new, valuable feature in the state of the art, from the rational employment of which a number of advantages may be derived.

Rotatably mounted on shank $b$ are a number of inner rings or tumblers, as $n$, to the sides of which are secured, relatively immovably, click-springs or resilient pawls $m$, through the medium of longitudinally projecting pins $n'$ on the former which enter corresponding perforations $m'$ on the latter, see Figs. 10, 11 and 16. Tumblers $n$ are encircled by exterior or permutating rings, as $r$, which, on their outer periphery, are suitably marked with characters as is well understood, while across a part of their inner periphery they are provided with grooves, or equivalent indentations $t$, in number, preferably, equal to the number of characters. With these grooves engage the suitably formed ends of click-springs $m$ and $v$, which are thus adapted to form resilient pawls whenever the permutating rings are rotated. The combination of such a tumbler $n$, a permutating ring $r$, pawl $m$ and pawl $v$, operatively grouped as described, forms a set, or as I prefer to term it, a permutating unit, each of which is entirely distinct from the other, and of which as many may be used on a lock as is necessary to obtain the number of possible combinations sought.

While click-pawls $m$ are secured to tumblers $n$ and thus can only be turned together with the latter, click-pawls $v$, through the medium of radially, inwardly projecting keys $v'$ which engage the two longitudinal keyways $b''$, are entirely prevented from rotating or moving in any direction. The several purposes and offices of pawls $m$ and $v$ are as follows: When the lock is closed and its parts in the positions shown by Fig. 1, wards $i$ and $i'$ are located in the annular recesses $l$ of tumblers $n$, the latter, therefore, may be freely rotated; furthermore, the permutating rings which encircle the tumblers, being in this position more or less rigidly secured to the latter, through end $y$ of spring pawl $m$, by turning the permutating rings the tumblers are turned as well. Spring pawls $v$, however, being held immovably through keys $v'$ and keyways $b''$ on shank $b$, a click furnished through end $x$ of spring pawl $v$ is given every time the permutating ring advances the space of a character. In this manner the "combination" of the lock may be set, that is, the tumblers are rotated until longitudinal grooves $o$ and $p$ on tumblers $n$ are thus brought opposite the wards $i$ and $i'$, respectively, when spring $s$ will be enabled to slide locking bolt $d$ in the direction of end piece $a$, indirectly ejecting shackle $f$ by reason of the inclined surfaces of transverse slot $d''$ acting on end $f'$ of the shackle. The ejection of the shackle causes the turning of its hinge pin $e$ and thereby brings the flat surface $k'$ of the middle or cam-shaped part of hinge pin $e$ into intimate contact with the inner end surface of aperture $d'$ of locking bolt $d$, see Fig. 5.

As is seen from Fig. 5, when the lock is open, each permutating unit, with all its members, is securely locked against rotation through wards $i$ and $i'$ engaging grooves $o$ and $p$ of tumblers $n$. To change the combination of the lock it is, first of all, essential to disengage the permutating rings from the tumblers for the purpose of rotating the former relative to the latter and thereby bringing different characters above grooves $o$ and $p$. I accomplish this by merely swinging the shackle backward, through an arc of about 135°, to the position shown in Fig. 12, which motion of the shackle, through the medium of the cam-shaped middle part of its hinge pin $e$, causes locking bolt $d$ to slide longitudinally to an extent to bring notches $g$ opposite the ends $y$ of pawls $m$. In this position, flat surface $k''$ of the hinge pin $e$ is in intimate contact with the inner end surface of aperture $d'$ of locking bolt $d$, being held there by the pressure of spring $s$, and spring-ends $y$ of pawls $m$ may now be depressed as readily as spring-ends $x$ and $z$ of pawls $v$ and the permutating rings rotated, while the tumblers are immovably held in place, with a double click, one each from spring-ends $x$ and $y$. Such a double click causes a greater resistance to rotation of the permutating rings when the combination is being changed and thereby serves as a safeguard in preventing any accidental or unintentional changing of the combination.

In closing the lock, from the position shown in Fig. 5, on swinging the free end $f'$ of the shackle downward to enter aperture $a'$ of end piece $a$, locking bolt $d$ is moved longitudinally, against the pressure of spring $s$, first through the turning of hinge pin $e$ and subsequently through the shackle end $f'$ pressing against the inclined surface of the transverse slot $d''$ of the locking bolt. After the shackle has been brought into the position shown by Fig. 1, the permutating rings may be rotated again and the combination obliterated, since wards $i$ and $i'$ passed during the motion of the locking bolt from grooves $o$ and $p$ into the annular recesses $l$.

To open the lock in the dark, I select a certain character for the starting point, or zero, and cause a certain pre-determined position of the same relative to grooves $o$ and $p$ to be clearly distinguishable, either audibly or through the sense of touch. This I accomplish by forming one of the grooves $t$ on the permutating rings, as $t'$, differently and, preferably, larger, and providing on pawl $v$ two click-springs, $x$ and $z$, instead of one, the ends of which are formed to correspond to the grooves $t$ and $t'$, respectively. As soon as spring end $z$, which is too large to enter grooves $t$, has entered groove $t'$, the resistance to rotation of the permutating rings is increased, to as marked a degree as desired, and by counting the characters in setting the combination any desired character may be reached without seeing it. In Figs. 8 and 9 such a zero groove $t'$ has only been shown in that part of the permutating ring which is acted upon by pawl $v$. However, a similar arrangement may be provided for to facilitate the changing of the combination in the dark.

To assemble or aggregate all parts of the lock in such a manner as to make their disaggregation, without damage to them, an impossibility, I proceed as follows:—I, preferably, assemble first the permutating units and slip one after the other over and onto shank $b$ and locking bolt $d$, being careful to have wards $i$ and $i'$ of locking bolt $d$, grooves $o$ and $p$ of the tumblers, grooves $o'$ and $p'$ of pawl $v$, and grooves $o''$ and $p''$ of pawl $m$ all in the same plane, and having a certain character, for example, letter A, on the index or reading line, which latter may be in the same or any other radial plane and is not shown in the drawings. I then place spring $s$ into its containing chamber compressed to such an extent that its radial extension or detent $s'$ is also forced into the containing chamber, where it is held by friction, as shown by dotted lines in Fig. 7, after which end piece $c$ is placed in position on shank $b$ and locking bolt $d$, with its side aperture $c'$ registering with apertures $b'$ of shank $b$ and the circular part of aperture $d'$ of locking-bolt $d$. When all these apertures are in alinement, hinge pin $e$ is inserted therethrough, and the lock is given a sudden blow or jolt releasing spring $s$ which assumes a position substantially as shown by Fig. 5 and Fig. 7. It will now be found that to withdraw the shackle from end piece $c$ it is absolutely necessary that detent $s'$ of spring $s$, which is normally in the bifurcation $h$, should be brought into the containing chamber of the latter again so as not to project radially beyond the diameter of the spring and permit locking bolt $d$ to slide sufficiently in the direction of the spring to release hinge pin $e$. However, being entirely inaccessible, it is physically impossible to remove detent $s'$ from bifurcation $h$ and out of the path of locking bolt $d$ to an extent required for the withdrawal of hinge pin $e$, therefore, the latter thus confines absolutely all of the parts of the lock and maintains same in operative and effective engagement after detent $s'$ has been allowed to snap into the position shown by Figs. 5 and 7.

To prevent any undesirable reduction in the number of possible combinations, which would be the case were wards $i$ and $i'$ of the same width, wards $i'$ of locking bolt $d$ are arranged to be of somewhat greater width than wards $i$, from which follows that grooves $p$ $p'$ and $p''$ must be wider than grooves $o$ $o'$ and $o''$ which engage the narrower wards $i$.

Arm $f''$ of the shackle, traveling through an arc of about 180 degrees in being swung from the position shown by Fig. 1 to the one shown by Fig. 12, may be utilized to actuate a suitable train of wheels held on end piece $c$ (not shown) for the purpose of furnishing an indication or a record of the locking and unlocking of the lock and whenever the combination has been changed, which will form the subject of a further application for Letters Patent.

From the above description is seen that locking bolt $d$ performs a variety of duties. Not only that it forms a closed link with the shackle, engaging the same at both of its ends and thereby giving a maximum degree of strength and rigidity to the lock, but it serves to determine the positions of the shackle when the lock is open and when changing the combination; furthermore, indirectly enables the changing of the combination in the simplest possible manner, as well as locks all parts of the lock in conjunction with the shackle hinge pin. The locking bolt is the only member of the lock having longitudinal motion, and being centrally located it slides between and within the two end pieces and the bifurcated shank which connects the former, while the several sets of tumblers or permutating units having rotary motion only are confined between the said end pieces and inseparably and undetachably held in position. It is also seen that there are no openings for water or dust to reach the mechanism of the lock, even should the lock be open.

The constructions and details herein described and shown being but a part of a large number of those that are mechanical equivalents thereof, I do not wish to be confined to what I have shown but desire to claim, broadly, as far as they are new, the essential means toward producing a permutation padlock which possesses the following features: 1: Entire absence of screws and rivets as well as of soldered and similar joints. 2: Absolute impossibility to take the finished lock apart or to detach any part therefrom without cutting, drilling, sawing or breaking into it, or otherwise defacing the same. 3: Ability to open the lock in the dark through sound or touch. 4: Ability to change the combination of the lock almost instantly and in a very simple as well as easily understood manner without the aid of tools or of dismounting any of the parts, and without any longitudinal motion of any member of the permutating unit, by merely swinging, backwardly, the shackle. 5: Providing click springs of greater resistance for changing the combination than for setting it. 6: Providing a shackle with a hinge pin in one piece which leaves no opening through its turning.

Having described my invention, what I claim as my invention and desire to secure by Letters Patent, is—

1. In a permutation padlock a locking bolt and a shackle provided with a hinge pin having a cam shaped cross section engaging said locking bolt and adapted to move the same.

2. In a permutation padlock a locking bolt and a shackle provided with a hinge pin having a cam shaped cross section engaging said locking bolt and moving it longitudinally when rotated.

3. In a permutation padlock a locking bolt and a shackle provided with a hinge pin having a cam shaped cross section engaging said locking bolt and moving it longitudinally a greater or less distance according to the extent of rotation of the hinge pin.

4. In a permutation padlock a locking bolt and a shackle having a hinge pin provided with a plurality of flat sides engaging said locking bolt and moving it longitudinally when rotated.

5. In a permutation padlock the combination of a plurality of permutating rings, a plurality of tumblers, a plurality of resilient pawls, each normally engaging a permutating ring and a tumbler and means for permitting relative movement of the permutating rings and resilient pawls.

6. In a permutation padlock the combination of a plurality of permutating rings, a plurality of tumblers, a plurality of resilient pawls, each engaging a permutating ring and a tumbler and a locking bolt provided with notches, into which the resilient pawls may be depressed.

7. In a permutation padlock the combination of a plurality of permutating rings, a plurality of tumblers, a plurality of resilient pawls each engaging a permutating ring and a tumbler, a locking bolt provided with notches into which the resilient pawls may be depressed and a shackle provided with a hinge pin having a cam shaped cross section engaging said locking bolt and adapted to move it longitudinally.

8. In a permutation padlock the combination of a bifurcated shank, a locking bolt movable longitudinally in the bifurcation of said shank, an end piece surrounding said locking bolt and shank, and a spring located in said end piece and coöperating therewith to limit the longitudinal motion of said locking bolt in one direction.

9. In a permutation padlock the combination of a bifurcated shank, a locking bolt movable longitudinally in the bifurcation of said shank, an end piece surrounding said locking bolt and shank, a shackle having a hinge pin passing through said end piece, shank and locking bolt, and a spring located in said end piece and coöperating therewith to limit the longitudinal motion of said locking bolt in one direction.

10. In a permutation padlock the combination of a bifurcated shank, a locking bolt movable longitudinally in the bifurcation of said shank, an end piece surrounding said locking bolt and shank, a shackle provided with a hinge pin having a cam shaped cross section adapted to move the locking bolt longitudinally and passing through the end piece, shank and locking bolt, and a spring located in said end piece and coöperating therewith to limit the longitudinal motion of said locking bolt in one direction.

In testimony whereof I have affixed my signature to this specification in the presence of two subscribing witnesses.

JOHN T. WHALEN.

Witnesses:
  J. C. BLAKE,
  LULU WARD.